United States Patent [19]

Illman et al.

[11] E Re. 29,287

[45] Reissued July 5, 1977

[54] APPARATUS FOR APPLYING HOT MELT SIZE MATERIAL TO TEXTILE YARNS

[75] Inventors: Walter F. Illman, Greensboro; Robert C. Malpass, High Point; Delano M. Conklin, Burlington, all of N.C.

[73] Assignee: Burlington Industries, Inc., Greensboro, N.C.

[22] Filed: Feb. 13, 1976

[21] Appl. No.: 658,063

Related U.S. Patent Documents

Reissue of:

[64] Patent No.: 3,862,475
Issued: Jan. 28, 1975
Appl. No.: 326,149
Filed: Jan. 23, 1973

[52] U.S. Cl. ..... 28/178
[51] Int. Cl.[2] ..... D06C 29/00
[58] Field of Search ..... 28/28, 72.6; 118/76, 118/77, 78, 202, 266, 405, 420, 421; 427/11, 345, 428, 434

[56] References Cited

UNITED STATES PATENTS

| | | | |
|---|---|---|---|
| 439,916 | 11/1890 | Whittlesey | 118/78 X |
| 2,022,854 | 12/1935 | Greenwood | 28/72.6 X |
| 2,438,084 | 3/1948 | Wood | 28/28 |
| 3,345,172 | 10/1967 | Land | 118/76 X |
| 3,479,988 | 11/1969 | Trost et al. | 118/78 |
| 3,625,735 | 12/1971 | Fernstrom et al. | 28/72.6 X |
| 3,732,603 | 5/1973 | Illman et al. | 28/28 |

FOREIGN PATENTS OR APPLICATIONS

| | | | |
|---|---|---|---|
| 1,088,196 | 9/1960 | Germany | 118/78 |

*Primary Examiner*—Louis K. Rimrodt
*Attorney, Agent, or Firm*—Cushman, Darby & Cushman

[57] ABSTRACT

A compact apparatus and method for applying hot-melt size in a properly fluid state to a plurality of textile yarns. The apparatus comprises an internally heated rotating cylinder made of heat-conducting material, with deep grooves formed around it, one groove for each yarn strand. The size is preferably applied by urging a block of solid size against the grooves of the hot cylinder. From the point of application the molten size is carried by the rotation of the cylinder to a zone where each moving yarn strand passes briefly through a corresponding size-filled groove, essentially tangentially to the cylinder, and then moves away coated with an optimum amount of size. The method of application is unique in its capacity for placing a quick-setting, high molecular weight, film-forming melt size on yarn at high speed.

7 Claims, 6 Drawing Figures

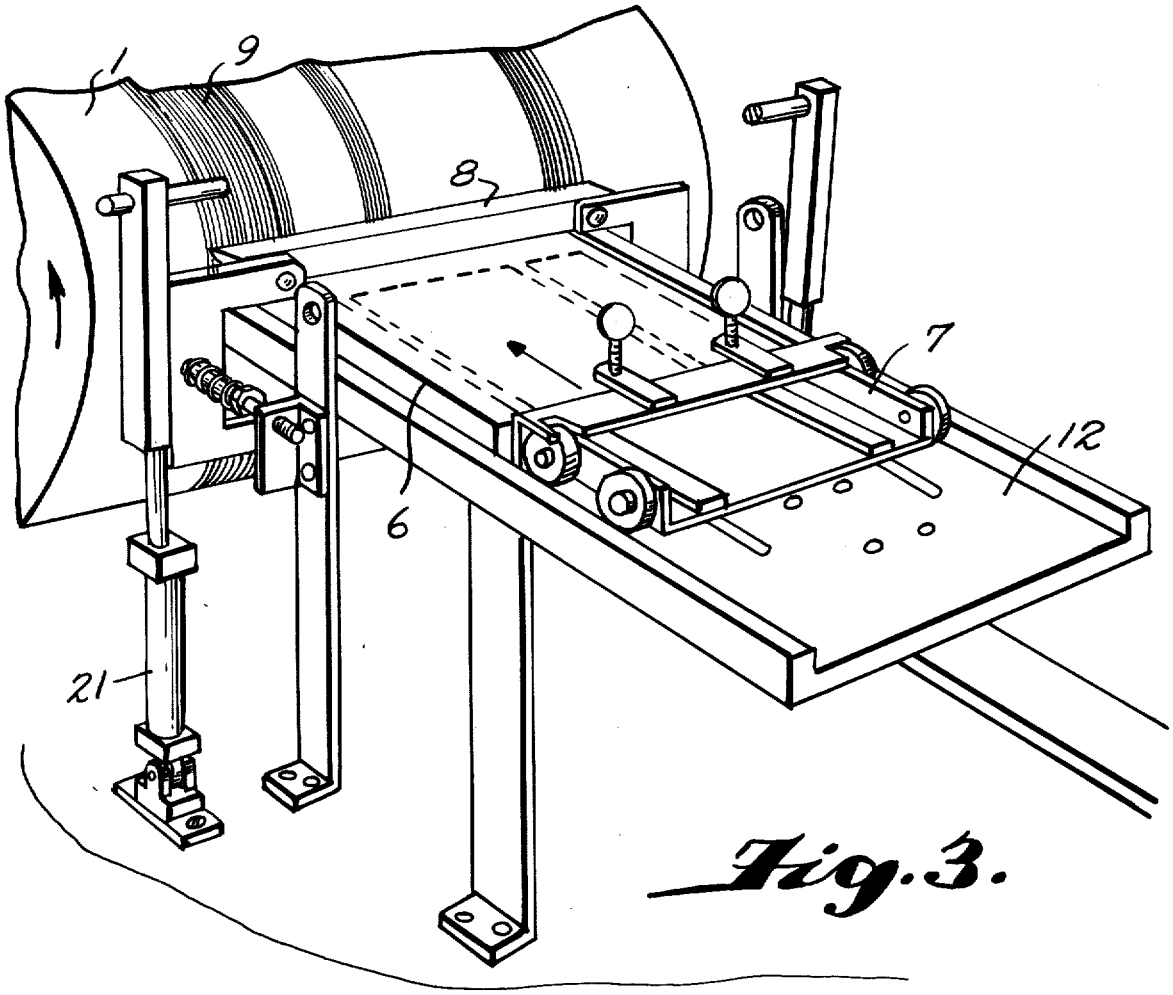
Fig. 3.
Fig. 6.
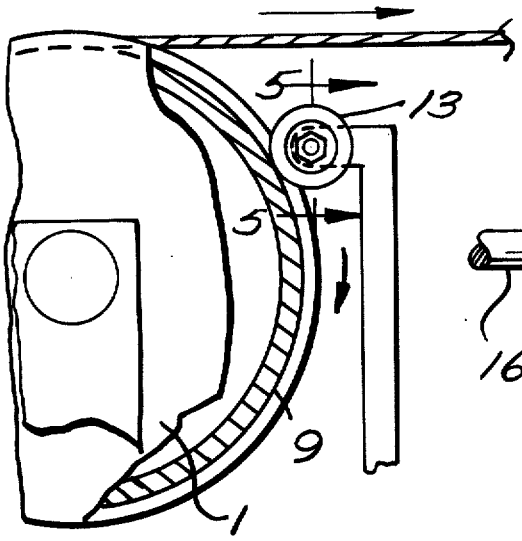
Fig. 5.
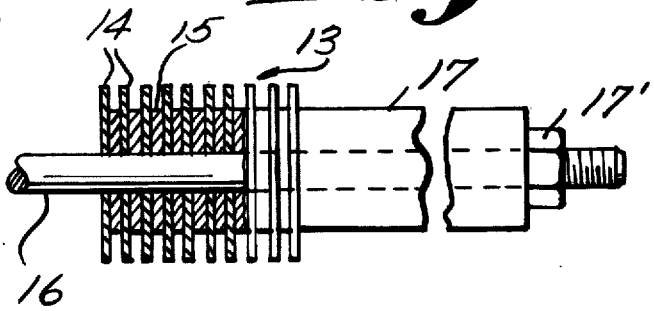

APPARATUS FOR APPLYING HOT MELT SIZE MATERIAL TO TEXTILE YARNS

Matter enclosed in heavy brackets [ ] appears in the original patent but forms no part of this reissue specification; matter printed in italics indicates the additions made by reissue.

BACKGROUND OF THE INVENTION

The invention relates to a method and apparatus for applying molten size to a plurality of textile strands.

In the process [if] *of* textile sizing, material usually called "size" or "sizing," most commonly in the form of an aqueous solution, is applied to individual textile warp yarn threads or strands to protect them from the physical abuse of the weaving operation. This type of sizing is not to be confused with the operation of applying "sizing" to a finished textile fabric to stiffen it, or add weight, or for other reasons of modifying finished character. In the case of individual warp threads which are treated with a size application before weaving to make them more resistant to the abrasive action of the loom, further purposes are to reduce the hairiness of the strands and thereby to eliminate their tendency to cling together because of such hairiness, to reduce shedding of fibers from the strands because of the abrasive wear on the yarn by mechanical devices during processing, and to reduce the rolling that entangles together adjacent unsized yarns. All of these factors can act to cause thread breakage, machine stoppage, and defects in the finished goods.

Most warp sizing machines in use today, generally termed slashers, apply size to individual warp strands by moving these strands through an aqueous bath of sizing material so that the sizing agent penetrates and adheres to the warp yarn strands. Simultaneous with the wetting of the yarn by size (usually by immersion) is a mechanical squeezing action that accomplishes a quetsching operation when the warp threads pass through the nip of the compressive rollers, usually one being of steel and the other of rubber-covered construction. The rolls also serve to remove excess size. Thereafter, the sized yarns are passed around the heated surface of several drying cylinders that accelerate the evaporation of moisture from the yarn. Thence the size yarn passes to a take-up mechanism to properly package it for the next stage of the manufacturing process.

These warp sizing machines are expensive. They are complex, with a large number of processing variables that are difficult to control satisfactorily. If uncontrolled, these variables can destroy uniformity and reduce the quality of the sized warp yarns and subsequently the woven product. Typical of the apparatus of aqueous warp sizing in the prior art are the U.S. Pat. Nos. to Bouvet 2,478,230, Still, 2,565,407, and Baltzer, 3,247,568. The Still patent features a grooved guide roller bearing a passing resemblance to the grooved applicator roller of the present invention, but differing from it drastically in function, location, groove shape, temperature, and utility in a melt-sizing system.

The system of applying a size dissolved in water to a yarn and depositing it by evaporating off the water is the most commonly practiced sizing method used by the textile industry today. Many less practical and effective ways have been suggested but they have not proved practical for general manufacturing processes. Spraying instead of passing the warp threads through a bath has been suggested. Generally, the suggested modified methods for sizing textile warp yarns all have in common the basic fact that they involve applying the size material from an aqueous or other solvent system, and that the solvent must afterwards be removed, thereby retaining the expense and large space and equipment requirements of the conventional sizing operation. The present invention proposes a method and apparatus have the capacity for applying a polymeric melt size to yarn by a solvent-free method and has as a result the potential of greatly reducing the operational expense and space previously required in conventional sizing operations.

[An alternative to aqueous sizing is disclosed in the patent of Kuroda, U.S. Pat. No. 3,466,717. Kuroda describes a melt sizing method and apparatus, but this system is expressly restricted to application of sizing compounds in which wax predominates. The fact that the major component of the size is wax assigns certain inherent characteristics to the size. One of these is a relatively low melt viscosity. Molten waxes are comparable to molten paraffin in viscosity. Castor wax, the "hardened castor oil" of Kuroda, has a viscosity of 9.5 centipoises at 300° F, compared to the 1000–2000 centipose viscosities of the polymeric sizes for which the present process and apparatus are designed. Even the inclusion of a minor proportion of poly-2-ethylhexyl acrylate in prior art size compounds tried merely to improve the film-forming and thickness characteristics of the melts by addition of a thickener. If the melt viscosity is not relatively low, probably comparable to that of conventional aqueous solutions of sizes, wax-based melt sizes will not, it is believed, process effectively in the applicator chamber of Kuroda. It will be seen, therefore, that the Kuroda apparatus and method very strongly resemble the conventional aqueous sizing system.]

SUMMARY OF THE INVENTION

The broad objective of this invention is the provision of a compact means for applying a predominantly polymeric film-forming hot-melt size to one or more moving threadlines, particularly warp yarns. In its simplest and most practical and preferred form the invention comprises a method and apparatus for melting a solid predominantly polymeric size directly onto a limited zone of the circumference of a heated grooved applicator cylinder, transferring the molten size to warp yarns moving rapidly through the grooves at another zone of the cylinder, rapidly solidifying the size on the coated yarns without the need for special auxiliary cooling means, and winding up the size yarns, all at high rates of yarn travel. The method and apparatus particularly provide a means for applying to yarn a class of novel melt sizing compositions described in our application of Robert C. Malpass, Walter F. Illman, and Delano M. Conklin entitled "Hot Melt Size and Yarn Sized Therewith" filed on Sept. 7, 1972 Ser. No. 286,946, the subject matter of that application being incorporated herein by reference.

BRIEF DESCRIPTION OF THE DRAWINGS

FIG. 3 shows a closer view of the grooved surface of the applicator cylinder and size table and pusher.

FIG. 5 is a front part sectional view of an optional groove-cleaning accessory.

FIG. 6 shows an end view of the groove-cleaning accessory of FIG. 5 in place.

DETAILED DESCRIPTION OF INVENTION

Figure 1:
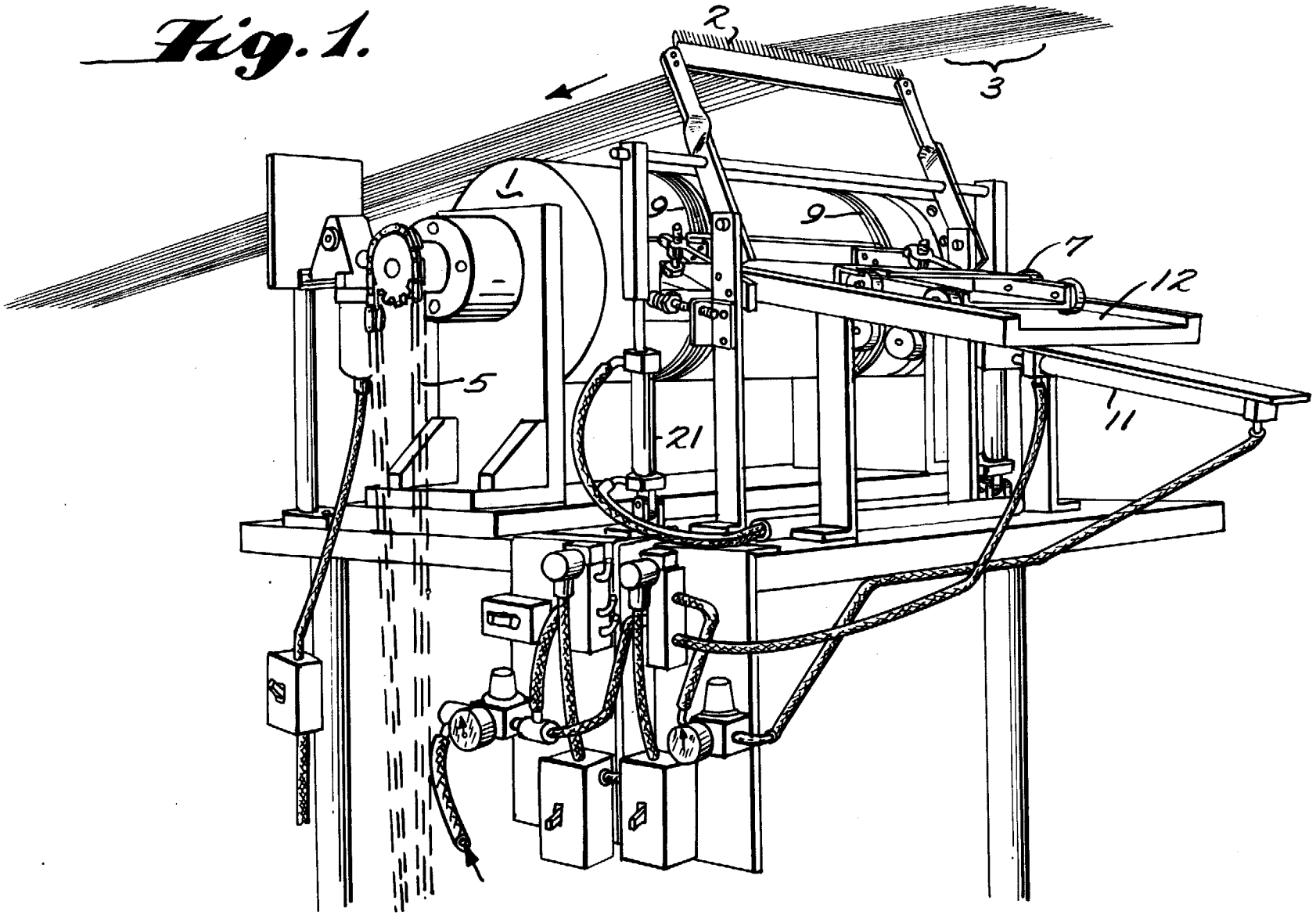
FIG. 1 shows a perspective view of one arrangement of a compact size applicator cylinder and associated accessories.

The invention in its broadest terms comprises a simple, but highly effective, process and apparatus for applying a film-forming, predominantly polymeric hot-melt size to yarn, especially to a multiplicity of parallel yarns comprising a warp. The size is applied to an axially oriented arc zone of the circumferential grooves of a heated, multigrooved, cylindrical applicator surface perferably as a solid block of size urged and controllably melted against said zone of hot grooves. As the block melts, it forms a molten liquid which moves with the continuous rotation of the cylinder to a region, most suitably at the top of the horizontal cylinder, wherein each of the individual warp yarns is briefly submerged in a corresponding groove, each yarn thereby becoming wetted by and preferably significantly squeezed through the melt before passing away from the cylinder. The apparatus is compact and permits a rapid application of size to the yarns.

An important part of the invention is the heated, rotating, cylindrical applicator roll or drum made of heat-conducting metal, preferably aluminum and preferably with its axis substantially horizontal. Around the circumference run a series of deep and closely spaced parallel grooves, one groove for each of one or more yarn threadlines, most suitably the multiplicity of parallel yarns constituting a warp. Closely associated with the grooved roll, besides conventional means for heating and rotating it, are a movable bar guide and comb spaced to drop each yarn into its corresponding groove and to lift it therefrom as needed, means for filling the grooves with size prior to the zone of contact of yarn with drum, one or more simple doctor blades to insure even distribution of size in the grooves, and optionally but preferably, a device for cleaning the grooves to prevent accumulation of lint in them during long periods of continuous use. An exhaust hood 10 for carrying away fumes given off by the type of hot size most suited to the apparatus may also be present.

Upstream of the applicator roller and its accessories, but only ancillary to the invention, are a conventional creel and eyeboard for supplying and holding the multiple feed yarns separate. Downstream, also ancillary, are an optional conventional over-oiler 18 and a standard spacer comb 19 and take-up mechanism or beamer to package the warp in whatever form is desirable for later use. Depending upon the particular melt size formulation being applied and the speed of the yarn, a space of a few feet in the open air between the applicator and over-oiler, such as two to fifteen feet, preferably about five to ten feet at speeds of 300–500 ypm, provides all the cooling needed to prevent tackiness at the oiler 18. Another distance of 15–25 feet in the open renders the yarn ready for wind-up at at 20 without danger of blocking on the package. The aforementioned co-pending Malpass et al application details a class of hot-melt size combinations capable of meeting these short distance requirements.

Turning to the drawings, FIGS. 1–4 show a preferred embodiment of the size applicator cylinder 1, comb or guide 2 for directing the yarn 3 onto the cylinder and movable by hydraulic or air pressure operated pistons and cylinders 21, electrical connections 4 to Calrod heaters for heating the cylinder, drive means 5 for turning it, solid size block 6, pusher means 7 for urging the block against the heated cylinder, and doctor blade 8 for levelling the size and scraping the cylinder to remove excess size and incidental fibers. Typically, the yarn remains in the grooves 9 over a length of 1½–3 inches, longer distances being less preferable because of excessive drag tensions as the yarn moves at high speed through the grooves of the slower turning cylinder. All of the components are shown in only one of a variety of possible spatial arrangements with respect to each other. Hood 10 above the cylinder draws off fumes generated in the application process.

A detector 22 may be disposed downstream of the yarn supply 23 for operating a delay mechanism 24 in the event that one or more of the yarn strands break.

Although its dimensions are subject to wide variation toward either smaller or larger units, a 10-inch diameter applicator cylinder, 21 inches long, made of 0.5-inch aluminum, and with 14 inches of grooved length along its axis, is a convenient and practical size. The driven end of the cylinder is closed with a welded-in plate, carrying a centered drive shaft, connected through a conventional ball-bearing and gear to a simple drive motor and the fixed frame supporting the whole assembly. The cylinder is rotated at about 2–8 rpm usually preferably at about 3 rpm when running with yarn speeds of around 300 ypm. The opposite open end of the cylinder is loosely closed against heat loss by a fixed circular collar which overlaps the interior of the cylinder about 2 inches and is welded to an end plate holding a plurality of fixed Calrod heaters in place beneath the shell of the cylinder. The cylinder preferably turns in the same direction as the moving yarns, i.e., clockwise with left-to-right yarn travel as viewed in FIG. 2, although the direction of rotation is not critical if the apparatus components are properly placed around the cylinder, and provided that yarn speed is not so great as to cause excessive drag and subsequent yarn breaks.

FIG. 3 more clearly depicts the grooves 9 circling the cylinder in close-spaced circumferential lines. Although their width and depth may advantageously be increased for sizing larger yarn, it has been found that, for yarns such as 50/50 polyester/rayon or 50/50 polyester/acrylic in 15 to 30 singles, grooves cut 10 per inch, 10–15 mils wide, and 50 mils deep are both effective and practical. Although no absolute limits are set for the depth of the grooves, they are herein referred to as "deep" in the sense that they should fully enclose the yarns being sized, and should have sufficient volume to provide an ample but not over-large excess of size. A depth of three to five times the diameter of the yarn being sized is considered optimal, but deeper grooves, though harder to machine and maintain, can be used if desired. If the grooves are too shallow, not only may the immersion of the yarn be inadequate to insure uniform contact with and application of size, but the supply of size may actually be insufficient to keep the grooves full enough in the limited zone of contact with the yarn. With too shallow a groove there may be a deficiency even though the rotation of the applicator cylinder is increased as a further means of delivering more size to the yarn. Depths of 50–100 mils, or greater with the larger yarn sizes, are contemplated.

The spacing, width, and shape of the grooves are capable of considerable variation, depending largely upon the construction and fiber type of the yarns being put through them. Since one of the practical objectives of the invention is to place as many yarn lines simultaneously on the face of a given length of applicator cylinder as possible, close spacing is desirable. The hairiness of the yarn — a function of fiber type, staple length, presence or absence of twist, and other parameters — is the chief factor setting a limit on the closeness of the grooves. In general, the more hairy the yarn, the greater should be the spacing between the grooves, especially if the yarn be fine and weak and easily subject to breakage in either sizing or subsequent conversion to fabric, should a fiber from one yarn become pulled over and entangled in an adjacent yarn line. There is no true upper limit upon how far apart the grooves can be, about 10 to 20 grooves per inch (or more, with twisted non-hairy yarns) being particularly suitable, and about 10 per inch being most preferred in yarns of average hairiness.

It is believed that groove widths substantially equal to the diameter of the yarn being sized are generally preferred. Wider grooves, however, are also satisfactory, through perhaps not quite so effective in laying the fibers and fiber ends protruding from the body of the yarn. Groove widths of 10–15 mils, with depths of 50 mils, have been used with notable success with a variety of yarns.

The shape of the grooves may be varied to advantage from substantially parallel to slightly tapered walls, all preferably with rounded bottoms. Grooves 50 mils deep, with polished walls tapering from about 15 mils apart at the surface of the cylinder to 10 mils at their rounded bottoms, have proved particularly effective and adaptable to a variety of yarn types and sizes, and these are preferred. The tapering appears to assist in two ways: promoting flow of size toward the bottom of the groove, and flexing and rolling the yarn as it is squeezed into and out of the gently constricting walls as it enters and leaves the groove.

Although the essentially open-shell structure for providing the grooved cylindrical surface is preferred for its versatility and relative ease of construction, other cylindrical grooved structures and means of constructing them will be readily apparent to those of ordinary skill. Suitable grooved applicators made by other means are considered to fall within the scope of the invention.

Figure 4:
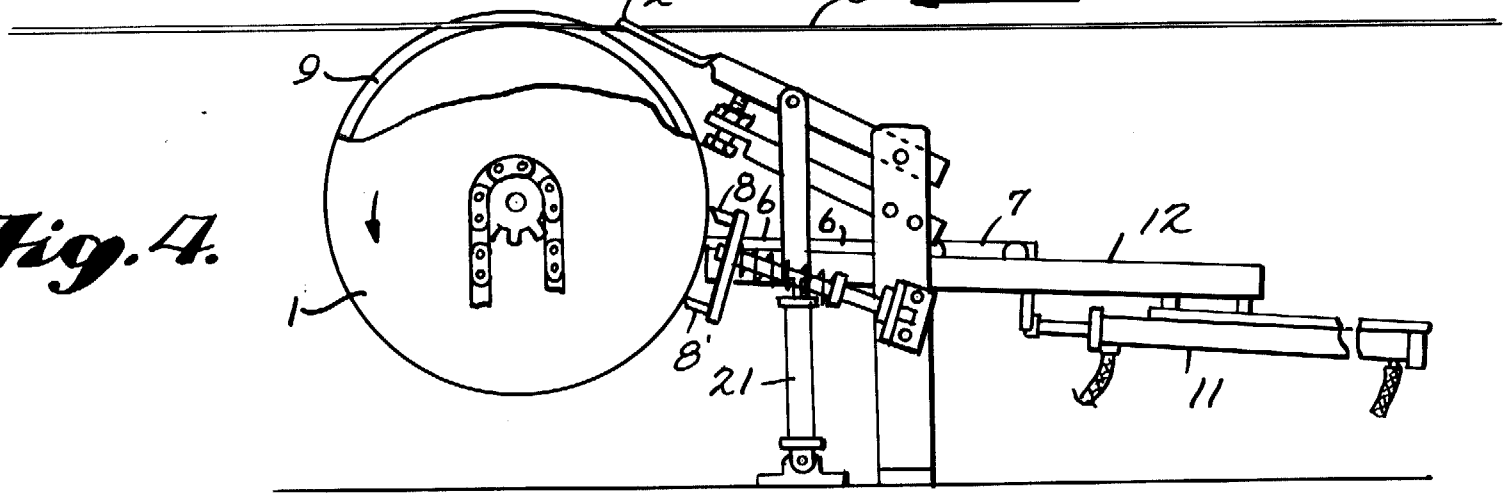
FIG. 4 illustrates the line of groove contact of a yarn strand and details a simple mechanism whereby a block of solid melt may be urged with controlled force against the grooves of the cylinder.

FIGS. 1–4 all depict means for applying solid size 6 to the applicator cylinder 1, at one of the convenient points for the operation, in this case at approximately the 3 o'clock position for 12 o'clock yarn contact and counter-clockwise cylinder rotation as viewed in FIG. 4. A block of size, typically 13.5 inches wide, one-half inch thick, and 12 inches long, is placed on a fixed platform 12 fitted with a free-rolling pusher 7, the latter being forced against the edge of the melt block by the pressure supplied by a piston and cylinder 11. The rate of melting of size is controlled by a combination of factors including the temperature and speed of the applicator cylinder, melting point of the size, and pressure against the size block. In practice the pressure on the block and the speed of the cylinder are the most easily adjusted variables in determining the weight of size added to the yarn.

To assist in pushing the size down into the grooves, as well as to keep the outer surface of the applicator as clear as possible of accumulations of size and loose fibers, a close-fitting doctor blade 8 is placed at a downstream point, conveniently at 3 o'clock as shown in FIG. 4. The position of the doctor blade is not critical, except that is should be between the points of addition and pick-up of the size.

When the process is to be set in motion, doctor blade 8 is placed in position, rotation of cylinder 1 (heated to the appropriate temperature) is started, pusher 7 is moved to press size block 6 against the applicator, and as soon as all are working smoothly comb 2 is lowered so that yarns 3 drop into grooves 9, the latter action being simultaneous with starting of the wind-up drive. The process is easily interrupted by raising comb 2 and turning off the wind-up.

Figure 2:
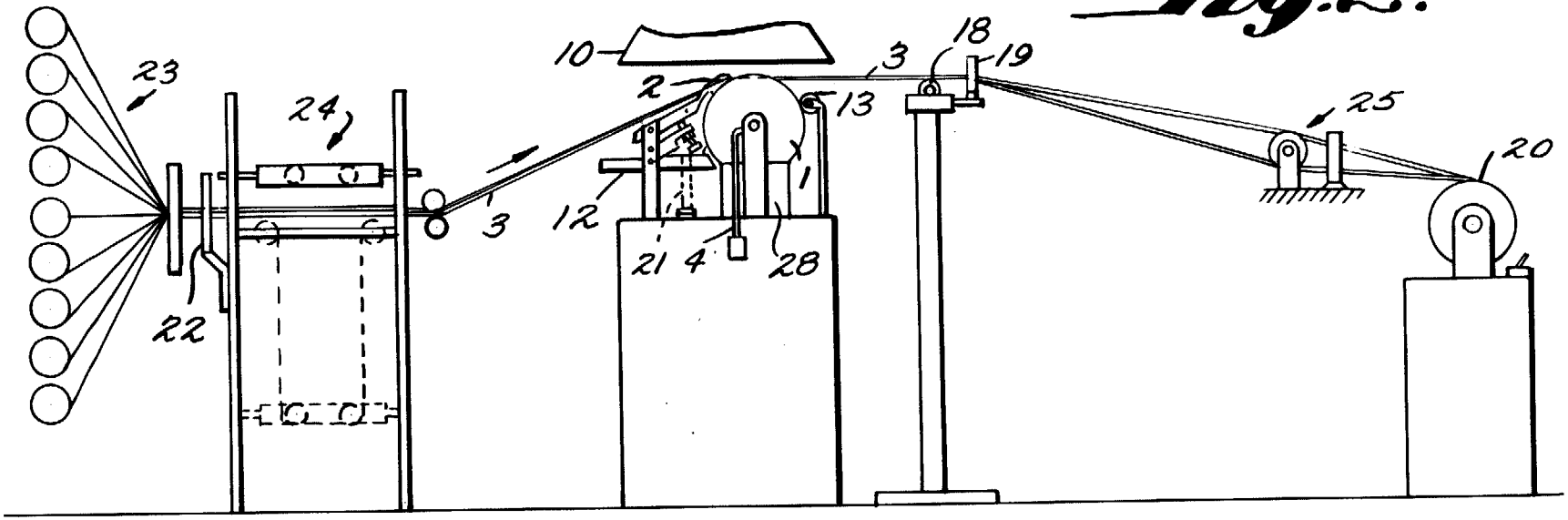
FIG. 2 is a schematic side elevational view of the mechanism of FIG. 1 and other accessories.

The arrangement of the components depicted in FIG. 2 is particularly convenient when used in conjunction with optional but preferred size levelling and groove-cleaning accessory 13, depicted in longitudinal, part section in FIG. 5 and in end view in FIG. 6. This accessory comprises a series of Mylar (DuPont polyethylene terephthalate film) washers 14, 5–10 mils thick, spindled alternately with a series of metal, preferably aluminum, spacers 15 (which may be of other construction such as plastic) onto a drive shaft 16 and held in place by cylindrical end pieces 17 and threaded nuts 17'. The Mylar washers are typically about one-fourth inch larger than the spacers. In use cleaner 13 is set, preferably opposite the size block, conveniently at the 2 o'clock position as shown in FIG. 2 parallel to size application cylinder 1 so that the plastic washers align perfectly within the grooves of cylinder. (To achieve this perfect alignment the aluminum spacers 15 must be made about 0.5 percent thicker than calculated, to allow for the differential thermal expansions of the heated cylinder and the cooler cleaner unit.) The shaft is mounted in end bearings and rotated at, for example, about 90 rpm, the effect being for the protruding plastic washers, reaching substantially to the bottoms of the grooves, to exert a rubbing and scraping action in the grooves to prevent accumulation and packing down of loose fiber lint which gradually becomes separated from the yarn and otherwise may cause stoppages for cleaning the cylinder. The lint either scatters from the surface of the plastic washers or, being kept stirred up, keeps continually entrained with the molten size and is carried along with the ongoing yarn.

It has been found advantageous, when using the cleaner as depicted, to supplement doctor blade 8 at 3 o'clock of FIG. 4 with an optional second doctor blade 8' before the size application point, such as at 4 o'clock, for example. The function of this second blade is essentially only to clean.

Besides the rotating cleaner just described, other cleaning means as may be known in the art may be used. Further, a very simple cleaning process at the end of the operating period is to place a tray of water 28 at the 6 o'clock position, and turn the hot drum through it until flushed clean.

Another convenient position for applying the size to the applicator is on the side opposite the 3 o'clock position illustrated in FIG. 4, i.e., the size is melted on at the 9 o'clock position, and the doctor blade is set at around 3 o'clock.

The specific positions cited for the various accessories are to be regarded as only exemplary. Other positions, both absolute and relative to each other, will readily be apparent to one of ordinary skill in the art.

To demonstrate the large-scale utilization of the invention, 140 packages of 22/1,65 percent polyester/35 percent rayon yarn were positioned on a yarn creel. The 140 yarn ends were pulled through an eyeboard in front of the creel and then through 140 1-inch 20-gauge tricot bar guides which were positioned one-half inch from the surface of a grooved aluminum roll. The 140 yarn ends were laid into every other slot of the bar guide. Each end was passed through its corresponding groove across the top arc of the aluminum applicator roll. The grooves, 15 mils wide at their tops, tapering to 10 mils at their rounded bottoms, were cut 10 grooves per inch. The surface temperature of the roll was 180° C, and the yarn speed was 300 ypm.

A large 60/40 melt blend of the Polymer C polyester of our copending application and adipic acid was cast as a ½ × 8 × 14-inch slab. The edge of the slab, at room temperature, was pushed against the face of the hot roll at a position of approximately 9 o'clock of FIG. 4, (180° from the location depicted and with scraper 8' omitted), at constant pressure, with the roll turning clockwise at 2¼ rpm, in the direction of yarn travel. Excess hot melt was wiped off at approximately 3 o'clock with a Teflon doctor blade. Only a few feet from the roll the yarn no longer felt tacky showing that the size had quickly solidified at least on its surface. The yarn was then passed over an over-oiler 18, which applied about 1 percent of oil, and from there through separating bar and a comb 21 to draw the yarn shed down to 20 ends per inch. Takeup was on a 7-inch tricot beam located approximately 20 feet from the melt applicator. Multiple 7-inch tricot beams were combined to make a warp suitable for knitting or weaving.

The yarn, on examination, was found to have greatly improved fiber lay, a size level of 9 percent and increased tensile strength and abrasion resistance.

The hereinbefore described preferred process for applying size to the grooved cylinder by pressure of the solid size block is attractively simple, and superior to others which have been investigated, particularly for sizes having any tendency to thermal degradation when held long in a molten state. Other means of applying the size to the applicator, such as by doctoring it on as a melt, or extruding it in various ways, as from a wide nozzle placed axially across the line of grooves, are regarded to fall within the scope of the invention.

As mentioned above, the novel embodiments of the invention hereinbefore described find particular utility in connection with water-soluble hot-melt size compositions of the type described in the copending Malpass et al application, although other suitable hot-melt sizes can be used. While the embodiment detailed has 141 grooves around the circumference of the cylinder, it will be understood that any reasonable number of grooves can be employed, and it is contemplated that in a full-scale machine, at least 500–600 grooves, each for receiving and applying sizing material to a strand, will be employed on each cylinder, and that any reasonable number of cylinders in parallel can be employed to apply size at the same time to warp strands passing the machine.

Many other changes and modifications in the above-described embodiments of the invention can, of course, be made without departing from the scope of the invention. Accordingly the scope is intended to be limited only by the scope of the appended claims.

What is claimed is:

1. An apparatus for applying sizing material to a plurality of textile strands *of given diameter*, the sizing material initially being *in* solid form, comprising [:]

a roller having a plurality of grooves therein extending circumferentially about the peripheral closed surface thereof, *each of said grooves having a depth greater than the given diameter of a textile strand cooperating therewith*, means for melting the sizing material and means for applying the sizing material to said roller *from the exterior of said roller* so that sizing is lodged in said grooves [thereof] *of said roller*, and means for rotating said roller so that sizing in said grooves is applied to textile strands each moving past said roller, and travelling [for] at least a short distance in a groove *immersed in sizing in said groove* so as to pick up at least a portion of the sizing in that groove.

2. An apparatus as in claim 1 wherein said means for receiving sizing includes means for heating said roller.

3. An apparatus as in claim 1 wherein said grooved roller is aluminum.

4. An apparatus for applying sizing to a plurality of textile strands comprising:

a roller having a plurality of grooves therein, extending circumferentially about the peripheral closed surface there, means for receiving sizing and applying the received sizing to said roller so that sizing is lodged in said grooves, including means for heating said roller and means for holding a solid block of sizing material and urging that block against said heated roller so that portions thereof are melted and lodged in said grooves, means for rotating said roller so that said sizing in said grooves is applied to textile strands each moving past said roller, and traveling for at least a short distance in a groove so as to pick up at least a portion of the sizing in that groove.

5. A combination for applying sizing to a plurality of textile strands comprising:

a roller having a plurality of grooves therein extending circumferentially about the peripheral closed surface thereof, a solid block of sizing material, means for heating said roller, means for receiving a solid block of sizing and holding a portion of said block in contact with said closed surface of said roller so that a portion of said sizing is melted by the heated roller and is lodged in said grooves, and means for rotating said roller so that said sizing in said grooves is applied to textile strands each moving past said roller, and travelling for at least a short distance in a groove so as to pick up at least a portion of the sizing in that groove.

6. *Apparatus as recited in claim 1 wherein the depth of each of said grooves is at least three to five times the diameter of a textile strand cooperating therewith.*

7. *Apparatus as recited in claim 1 further comprising means for cleaning the grooves in said roller after immersion of textile strands therein.*

* * * * *